(No Model.) 3 Sheets—Sheet 1.

W. G. TAYLOR.
NATURAL GAS BURNER.

No. 500,694. Patented July 4, 1893.

Witnesses
Jno. G. Hinkel
A. N. Dobson.

Inventor
William G. Taylor,
by Foster Freeman
Attorneys (No Model.) 3 Sheets—Sheet 2.

W. G. TAYLOR.
NATURAL GAS BURNER.

No. 500,694. Patented July 4, 1893.

Witnesses:
Inventor.
William G. Taylor (No Model.) 3 Sheets—Sheet 3.
W. G. TAYLOR.
NATURAL GAS BURNER.

No. 500,694. Patented July 4, 1893.

Witnesses:
H. E. Harrison,
H. M. E. Stevenson.

Inventor:
William G. Taylor
by J. H. Stevenson
Atty.

UNITED STATES PATENT OFFICE.

WILLIAM G. TAYLOR, OF HULTON, ASSIGNOR TO THE TAYLOR BURNER COMPANY, LIMITED, OF PITTSBURG, PENNSYLVANIA.

NATURAL-GAS BURNER.

SPECIFICATION forming part of Letters Patent No. 500,694, dated July 4, 1893.

Application filed September 21, 1892. Serial No. 446,482. (No model.)

*To all whom it may concern:*

Be it known that I, WILLIAM G. TAYLOR, a citizen of the United States, residing at Hulton, in the county of Allegheny and State of Pennsylvania, have invented certain new and useful Improvements in Natural-Gas Burners; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is a burner for burning natural gas.

Figure 1:
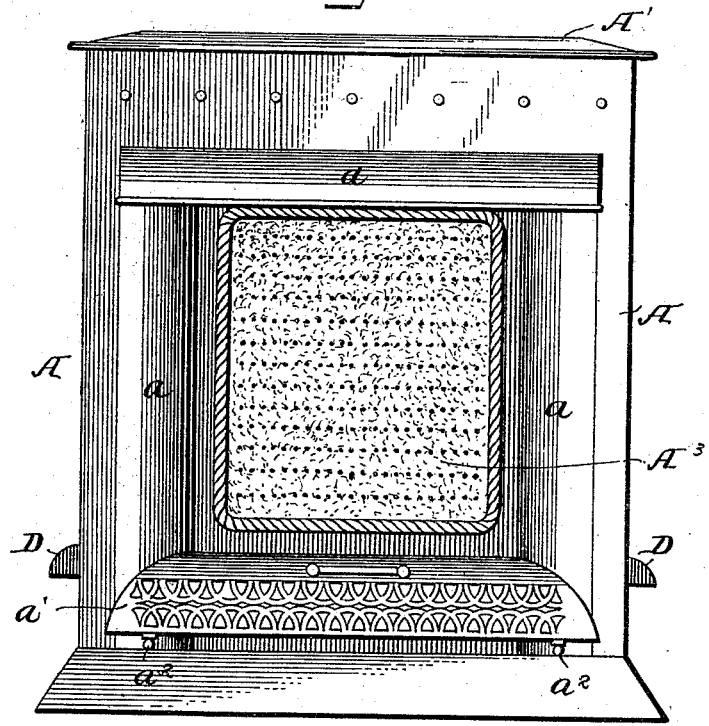
Figure 2:
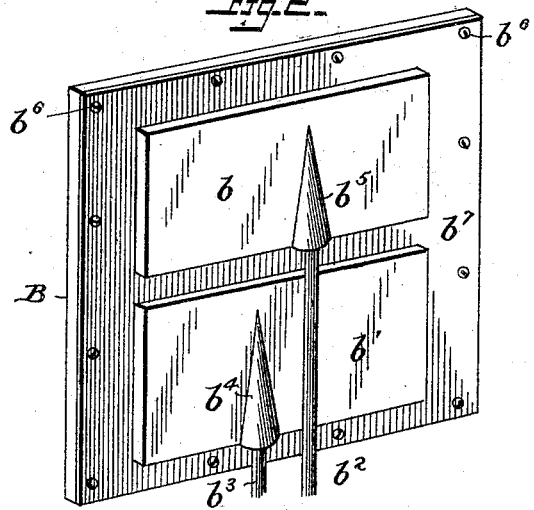
Figure 3:
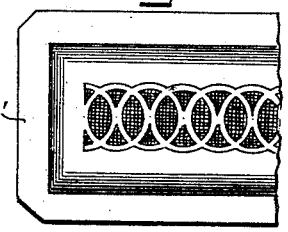
Figure 4:
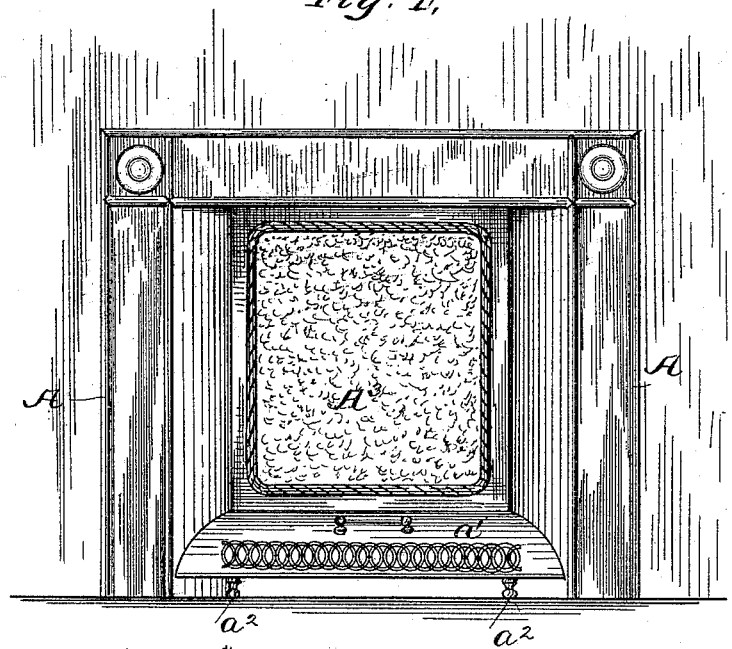
Figure 5:
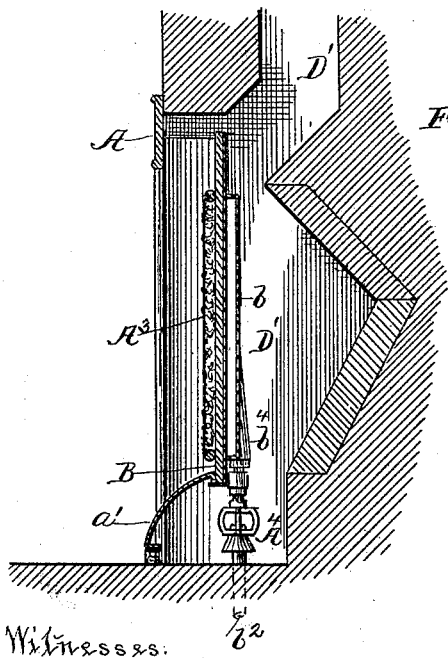
Figure 6:
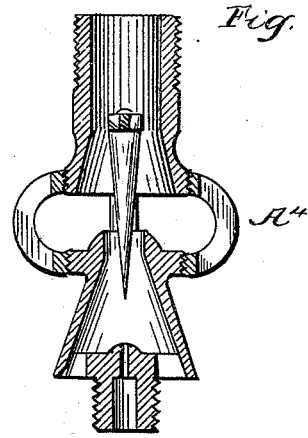
Figure 7:
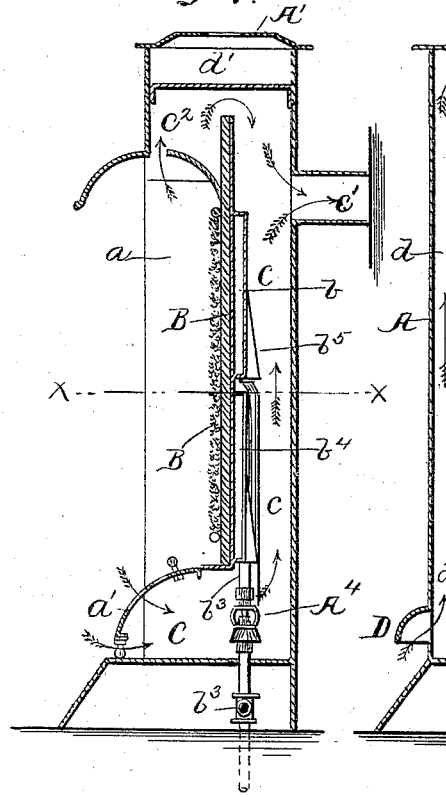
Figure 8:
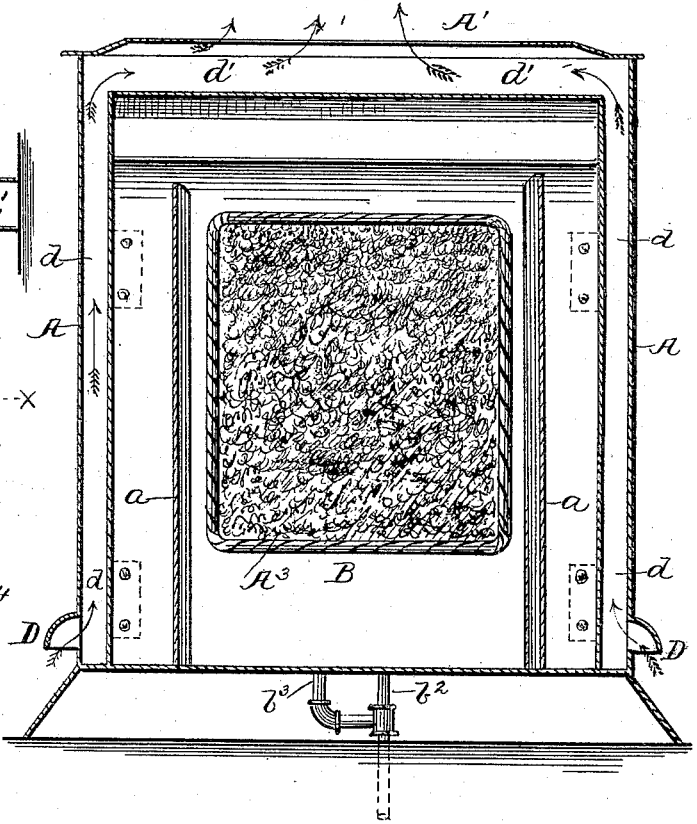
Figure 9:
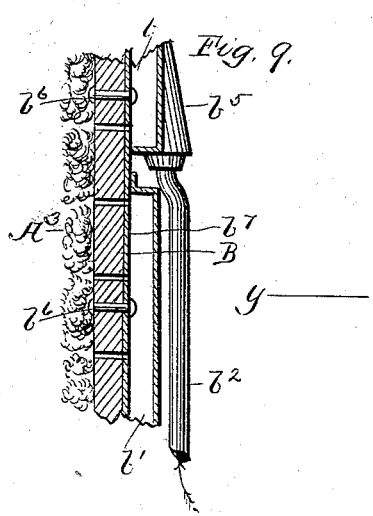
Figure 10:
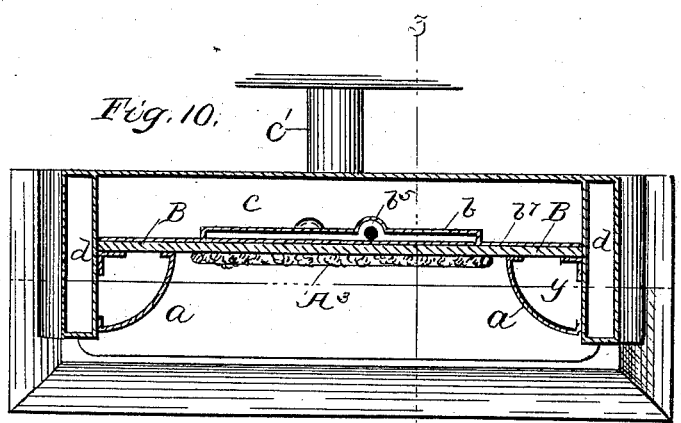

In the accompanying drawings Figure 1, is a front view, showing a heater with my burner applied. Fig. 2, is a rear perspective view of the burner detached. Fig. 3, is a partial plan view of the heater. Fig. 4, is a front elevation of a fire-place with the burner arranged in connection therewith. Fig. 5, is a vertical, transverse section of the burner, placed in a fire-place of ordinary construction. Fig. 6, is an enlarged sectional view of a mixer used in connection with the burner. Fig. 7, is a vertical, transverse sectional view, showing the burner mounted in a heater arranged outside of the fire-place or chimney, taken on line $z-z$, Fig. 10. Fig. 8, is a longitudinal vertical section on the line $y-y$ Fig. 10. Fig. 9, is an enlarged sectional view of the burner; and Fig. 10, is a horizontal section on the line $x-x$, Fig. 7.

A. A represent the frame work surrounding my gas burner.

A' is the top of the heater in which I place the burner.

$a\ a\ a$ are the rounded sides and top surrounding the burner proper. These sides $a\ a\ a$ are made of brass and serve as a reflector of the heat.

$a'$ is a movable piece having legs $a^2\ a^2$, and this serves the same purpose as the parts $a$. The space below the part $a'$ allows air to pass underneath the burner.

B is the asbestus board which I use in forming my burner.

$b$ is a gas chamber and below it is another gas chamber $b'$, and gas enters these chambers through the pipes $b^2\ b^3$ and into the cone shaped tubes $b^4$ and $b^5$.

$b^6\ b^6$ are rivets holding the asbestus board to the tin plate $b^7$.

$c\ c\ c$ is an air passage around the burner. In Fig. 7 this air passage is seen. Here the arrows show the entrance of the air at the bottom, and on up and around the back or rear of the burner, inside the frame of the heater, finding exit through the pipe $c'$. In this figure I show a down draft as well as an up draft. The small opening at the top not being sufficient for draft the air will also pass in below as seen in the drawings. In the heater I also have a device for admitting air around the burner. Here the air is admitted at D D at the sides, and then passes up the sides to the top apartment $d'\ d'$ out of the apartments $d\ d$. The air in these apartments $d$ and $d'$ becomes heated and in this state is permitted to escape through the top part of the burner, which is perforated for the purpose.

The gas chambers are quite shallow, not over one half of an inch. By reason of being so shallow the body of gas confined therein is brought close up to the heated surface of the burner and becomes superheated, in which state the gas is the better prepared for combustion being highly expanded and thoroughly mixed with the air that is admitted into and through the mixer.

It will be seen by reference to the drawings that I use but one of the chambers $b-b'$ (wherein the gas is heated and mixed ready for combustion), in Fig. 5 while the burner as seen in Fig. 2 shows two of these chambers. I show my invention in this way for the reason that a single gas chamber will suffice, or will be effective in producing a certain degree of heat, but I find that better results are obtained by use of two of them. These chambers will be connected to separate gas pipes so that one or both may be used at one time at will.

The gas is admitted to the asbestus wool on the face of the burner through a number of parallel lines of perforations, seen in Fig. 9.

In constructing the chambers $b$ and $b'$ great care is needed to make them thoroughly gas tight; otherwise there might be a leakage and loss of the gas.

To more thoroughly prevent any downward draft over the face of the board, I provide a lip $e$ along the bottom which projects forward and also serves as a rest for the movable rounded piece $a'$. This lip makes a practically air tight joint with the rounded piece and aids in causing the air to be drawn in at the bottom of the heater and prevents the air impinging upon the perforated face of the heater which would interfere with the burning of the gas and the throwing of the heat therefrom directly into the room.

It will be seen that in the different constructions which I show, the air is drawn in at the bottom of the heater as near as may be to the bottom of the hearth or level of the floor, and that I so arrange the parts that the main or direct draft is at the back of the heater and upward to the flue while there is comparatively little draft at the front, only sufficient to carry off the deleterious products of combustion. By this means, I am enabled to secure a draft that carries out and upward to the flue the foul air of the room and at the same time, I avoid precipitating upon the heated surface of the heater, a mass of cold air which would chill it down and destroy the heating effect.

It will be evident, of course, that different arrangements of flues and of the heater in a fire-place of ordinary construction may be employed so as to secure this result, but I have found that in all cases, it is necessary to have an air inlet or passage in proximity to the hearth for the air at the bottom of the room to flow to the back of the heater, that there must be a main flue or passage behind the perforated plate, and that the heater must extend above the upper edge of the fire-place opening. Other arrangements, of course will depend upon the peculiar conformation of the chimneys and fireplaces.

I am aware that perforated slabs recessed to produce openings for the reception of the gas and with perforations extending to the front have been employed, but the peculiarity of the above described construction is in the use of a slab of asbestos material which can be cut from or formed in a sheet at comparatively slight expense in connection with a flanged metallic or other plate, the flange of which is connected to the fibrous slab to form a chamber. By this means I am enabled to have a highly refractory front surface and at the same time, secure the combustion chamber at a comparatively slight expense.

In Fig. 5 my burner is shown as placed in a chimney. Here $D'$ is the flue, and $A^4$ the mixer. Here the burner is shown with but one of the gas chambers $b$—$b'$.

Having thus described my invention, what I claim, and desire to secure by Letters Patent, is—

1. The combination with the fireplace, of a portable fireplace gas burner consisting of a perforated plate having a gas distributing chamber at the back and supplied with a mixture of gas and air for burning at the front exposed face of the burner, said burner being arranged in the fireplace and in respect to the back flue thereof to form a main draft at the back of and underneath the burner, substantially as set forth.

2. The combination with a fireplace, of a portable gas burner provided with an exposed face, and means for heating said face, a contracted opening arranged above the burner and leading to the draft flue, and air passages beneath said gas burner leading to a flue at the back of the burner, the latter air passages being of a larger size than that above the burner to secure the main draft at the back and air from the front of the burner, substantially as set forth.

3. The combination with a fireplace, of a portable gas burner having a front exposed face with perforations leading to said face, and with a chamber or chambers at the back communicating with said perforations, of an air or gas mixer and a surrounding frame having passages below and at the back of the burner, and side passages or flues communicating with openings at the top of the burner, substantially as set forth.

In testimony whereof I affix my signature in presence of two witnesses.

WILLIAM G. TAYLOR.

Witnesses:
J. K. BARBOUR,
W. EVANS.